United States Patent [19]

Swietlik

[11] Patent Number: 4,865,138

[45] Date of Patent: Sep. 12, 1989

[54] DRILL STRING STABILIZER

[76] Inventor: George Swietlik, The Sandings, Broadview Rd., Oulton Broad Lowestoft, Suffolk, Nr32 3PL, Great Britain

[21] Appl. No.: 237,937

[22] Filed: Aug. 23, 1988

[51] Int. Cl.$^4$ .............................................. E21B 17/10
[52] U.S. Cl. ................................... 175/325; 166/241; 24/279
[58] Field of Search ................ 175/325, 320; 166/241; 24/279; 285/367, 373, 420

[56] References Cited

U.S. PATENT DOCUMENTS

| | | | |
|---|---|---|---|
| 1,497,549 | 6/1924 | Conradi | 24/279 UX |
| 2,250,653 | 7/1941 | Safford | 24/279 X |
| 2,936,186 | 5/1960 | Dunmire | 24/279 X |
| 3,397,017 | 8/1968 | Grant et al. | 175/325 |
| 4,004,326 | 1/1977 | Beavers | 175/325 X |
| 4,042,023 | 8/1977 | Fox | 166/241 |
| 4,275,935 | 6/1981 | Thompson et al. | 175/325 |
| 4,483,395 | 11/1984 | Kramer et al. | 166/241 |
| 4,639,020 | 1/1987 | Rung et al. | 24/279 |
| 4,653,782 | 3/1987 | Munday | 285/373 |
| 4,664,428 | 5/1987 | Bridges | 285/373 |

FOREIGN PATENT DOCUMENTS

| | | |
|---|---|---|
| 0010559 | 5/1980 | European Pat. Off. . |
| 0132192 | 7/1984 | European Pat. Off. . |
| 0194034 | 2/1986 | European Pat. Off. . |
| 1291304 | 3/1969 | Fed. Rep. of Germany . |

OTHER PUBLICATIONS

Cundy et al., "Mathematical Models", 2d Edition, 1961, Oxford University Press, London, pp. 49–55.
Spiegel, "Mathematical Handbook", McGraw-Hill Book Co., N.Y., 1968, p. 43.

Primary Examiner—Stephen J. Novosad
Attorney, Agent, or Firm—Wegner & Bretschneider

[57] ABSTRACT

A stabilizer for a drilling string comprises a one-piece metal loop, stabilizing blades, and tightening bolts co-operating with internally threaded bores to draw the end portions of the loop towards each other. One end portion is formed with an involute camming surface on which the other end portion rides to urge the one end portion resiliently inwards.

11 Claims, 2 Drawing Sheets

4,865,138

DRILL STRING STABILIZER

BACKGROUND OF THE INVENTION

1. Field of the Invention

This invention relates to a clamping device, especially for use in well drilling, in particular a stabilizer for a drilling string.

2. Description of the Prior Art

U.S. Pat. No. 4,275,935 discloses a stabilizer for a drill string. The stabilizer is of a split configuration having an open slot which extends for the length of the stabilizer. The split stabilizer is slipped over a drill collar and nuts-and-bolts are used to draw the split stabilizer together to clamp the stabilizer to the drill collar. The stabilizer may thus be positioned at any desired axial location on the drill collar and non-rotatably locked thereto by the nuts-and-bolts. The stabilizer is made in one piece of a non-magnetic metal.

This stabilizer is designed to bear evenly, in its clamped condition, upon a drill collar of a particular diameter around substantially the whole external periphery of the drill collar. However, differences in the external diameters of drill collars of the same nominal diameter can result in a less than optimum bearing of such stabilizer upon a drill collar, so that a desired immobilizing clamping force on the drill collar may not be obtained. To try to meet this difficulty, U.S. Pat. No. 4,275,935 discloses that a shim of cylindrical form having an axially extending split can be utilized between the stabilizer and the collar. However, such a shim cannot cope optimally with a range of diameters and moreover constitutes not only an additional part but also a part that owing to its thinness is easily damaged in the very rough usage to which drilling equipment is normally subjected.

EP0132192, corresponding to U.S. Pat. Nos. 4,611,839 and 4,639,020, discloses a segmented coupling for use in sealing adjacent pipe ends. The coupling includes two semi-circular coupling segments having bolting pads at their ends, the ends of each coupling segment including inclined, planar end faces for cooperation with correspondingly inclined planar end faces of the other coupling segment to produce self-adjustment of the coupling and firmer clamping of the pipe ends upon tightening down of the coupling.

EP0194034, corresponding to U.S. Pat. No. 4653782, discloses a pipe repair clamp of a similar construction.

SUMMARY OF THE INVENTION

According to one aspect of the present invention, there is provided a stabilizer for a drilling string, comprising a one-piece metal loop having first and second opposite end portions, stabilizing blades fixed relative to said loop and projecting outwardly therefrom, and tightening means operable to displace said end portions towards each other, wherein the improvement comprises surface portions of said first end portion defining a camming surface obliquely inclined to the tangential sense of said loop, said second end portion being arranged to ride on said camming surface, and said tightening means being operable to displace said end portions towards each other to cause said second end portion to ride on said camming surface, thus to cause one of said end portions to be urged resiliently inwards by the other of said end portions.

An advantage of this present stabilizer is that tightening of the tightening means produces a clamping displacement of the loop not only in the direction of tightening of the tightening means but also in the substantially radial direction perpendicular thereto, so that improved bearing of the stabilizer upon a drill collar, for example, can be obtained and the use shims can be avoided.

According to another aspect of the present invention, there is provided a clamping device, comprising loop means having an axis encircled by the loop means and having first and second opposite end portions, surface portions of said first end portion defining a camming surface obliquely inclined to the tangential sense of said loop means, and said second end portion being arranged to ride on said camming surface, and tightening means operable to displace said end portions towards each other to cause said second end portion to ride on said camming surface, thus to cause one of said end portions to be urged resiliently inwards by the other of said end portions, wherein the improvement comprises said camming surface being of a curved form in planes perpendicular to the axis of said loop means, said curved form being outwardly bowed relative to said axis.

According to a further aspect of the present invention, there is provided a clamping device, comprising loop means having an axis encircled by the loop means and having first and second opposite end portions, surface portions of said first end portion defining a camming surface obliquely inclined to the tangential sense of said loop means, and said second end portion being arranged to ride on said camming surface, and tightening means operable to displace said end portions towards each other to cause said second end portion to ride on said camming surface, thus to cause one of said end portions to be urged resiliently inwards by the other of said end portions, wherein the improvement comprises said camming surface being of a curved form in planes perpendicular to the axis of said loop means, with the angle of inclination of the curved form to the radial direction from said axis gradually increasing as the distance of said curved form from said axis gradually increases.

An advantage of the use of a camming surface of such curved form is that, compared to a planar camming surface, a given clamping displacement in the direction of tightening produces a more nearly equal clamping displacement in the substantially radial direction perpendicular thereto.

BRIEF DESCRIPTION OF THE DRAWINGS

In order that the invention may be readily understood and readily carried into effect, reference will now be made, by way of example, to the accompanying drawings, in which.

DESCRIPTION OF THE PREFERRED EMBODIMENT

Figure 1:
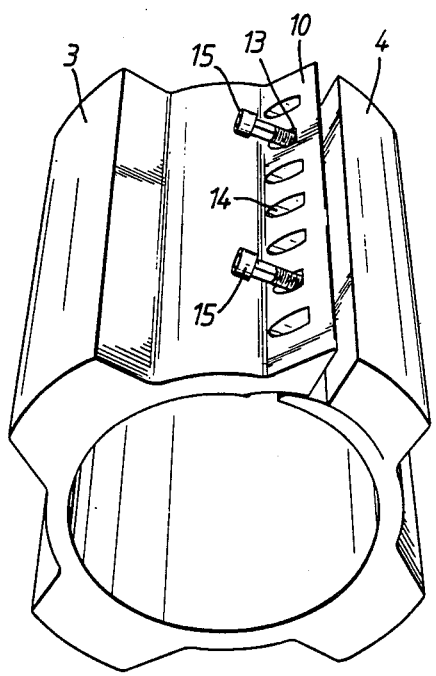
FIG. 1 shows a perspective view from one end of a stabilizer for a drilling string.
Figure 2:
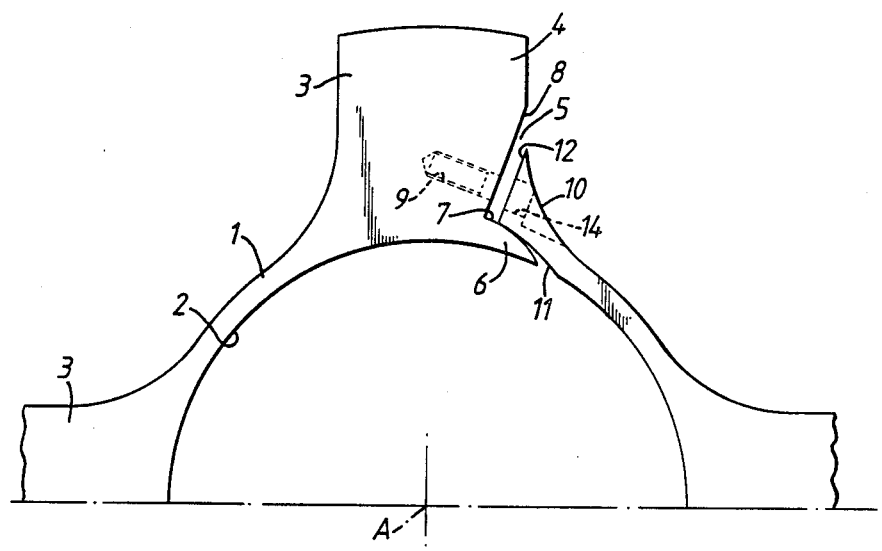
FIG. 2 shows a half elevation of the other end of the stabilizer.
Figure 3:
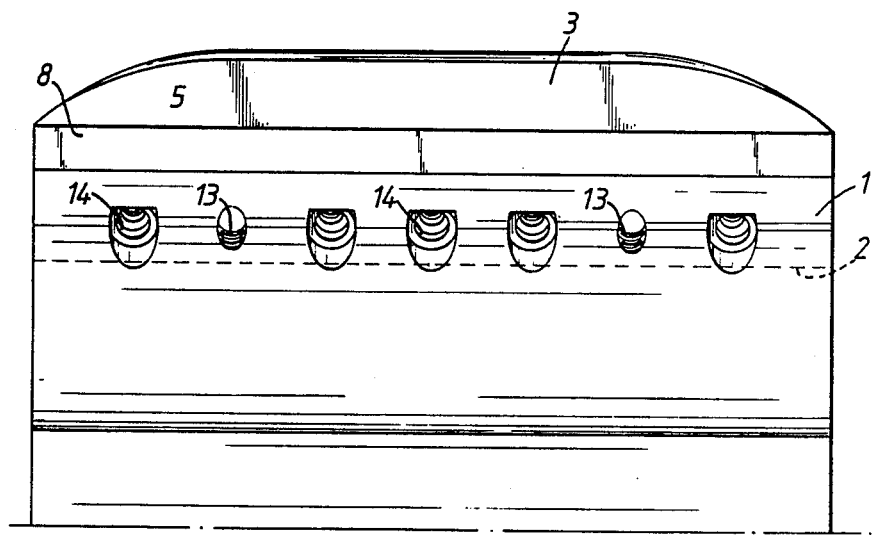
FIG. 3 shows a half elevation of one side thereof.

Referring to the drawings, the stabilizer comprises an open loop 1 of steel, which has an internal cylindrical surface 2 and which externally is formed integrally with stabilizing blades 3, which may be either rectangular-ended as shown in FIG. 1 or radiused-ended as shown in FIG. 3.

One end portion 4 of the loop 1 is in the form of one of the blades 3 with a cut groove 5 in the free longitudinal edge of its root. Extending from one end to the other of that groove 5 and bounding the radially inner side of that groove is a tongue 6 of constant cross-section defined internally by the surface 2. The outer surface of the tongue 6 is in the form of a camming surface 7 which extends curvedly obliquely to the tangential sense of the loop 1. As can be seen from the drawings, the curved form of the surface 7 is outwardly bowed relative to the axis A of the loop 1, and the angle of inclination of the curved form to the radial direction from the axis A gradually increases as the distance of the curved form from the axis A gradually increases. The curve is an involute of a circle, the curvature of the involute being chosen so that a given clamping displacement in the direction of tightening of bolts 15 produces a substantially equal clamping displacement in the substantially radial direction perpendicular thereto. The other surface of the groove 5 is a planar surface 8 which extends in the chordal sense of the loop 1 and is formed perpendicularly with five cylindrical threaded bores 9 distributed along the groove 5. The other end portion 10 of the loop 1 is in the form of part of the material from the groove 5 and has an inner surface 11 of a form similar to that of the surface 7, and a planar surface 12 which is substantially parallel to the surface 8. Formed through the portion 10 perpendicularly to the surface 12 are two internally threaded bores 13 and five oval plain slots 14, the items 13 and 14 being regularly spaced apart along the portion 10. However, the two bores 13 are arranged next inwards from the outermost slots 14. The bores 9 are aligned with the respective slots 14.

In the position naturally taken up by the loop 1, there is a gap between the faces 8 and 12, and the face 11 extends to immediately adjacent to the surface 7. To clamp the stabilizer around a sleeve of a drilling string, first of all, and using an Allen key or a torque wrench, two bolts 15 are screwed into the respective threaded bores 13 and rotated to bear against the surface 8 and then to push the end portion 10 away from the end portion 4 to open out the loop 1 slightly. Then the stabilizer is applied co-axially over the end of the sleeve to a desired position longitudinally of the sleeve. Then the bolts 15 are removed and identical bolts (15, but not shown) are inserted through the slots 14 and screwed into the threaded bores 9 to pull the end portions 4 and 10 towards each other, in the process of which the surface 11 rides up the tongue 6 to cause the portion 4 to be urged resiliently radially inwards by the portion 10. The pulling of the portions 4 and 10 towards each other naturally reduces the internal diameter of the loop 1 parallel to the axes of the bolts, whilst the riding of the surface 11 up the tongue 6 reduces the diameter perpendicular to those axes, so to cause the surface 2 to press tightly against the outer surface of the sleeve round substantially its whole periphery.

The positioning of the bores 9 and 13 and the slots 14 and their angle of inclination to the central axial plane of the blade 3 constituting the end portion 4 depends upon the outside diameter of the sleeve, i.e. upon the diameter of the loop 1, but the angle is advantageously between about 110° and about 140° for a sleeve outside diameter of between about 8" and about 20". It is selected so as to avoid excessive friction between the portion 10 and the camming surface 7 during clamping and to prevent any bending moment on the bolts.

I claim:
1. A stabilizer for a drilling string, comprising a one-piece metal loop having first and second opposite end portions, stabilizing blades fixed relative to said loop and projecting outwardly therefrom, and tightening means operable to displace said end portions towards each other, wherein the improvement comprises surface portions of said first end portion defining a camming surface obliquely inclined to the tangential sense of said loop, said second end portion being arranged to ride on said camming surface, and said tightening means being operable to displace said end portions towards each other to cause said second end portion to ride on said camming surface, thus to cause one of said end portions to be urged resiliently inwards by the other of said end portions.

2. A stabilizer according to claim 1, wherein said first end portion is in the form of one of said blades.

3. A stabilizer according to claim 2, wherein said one of said blades has a groove in the free longitudinal edge of the root of the blade and the groove is bounded by said camming surface on a radially inner side thereof.

4. A stabilizer according to claim 2, wherein said tightening means extends at an angle of inclination to a central axial plane of said one of said blades of between 110° and 140°.

5. A stabilizer according to claim 1, wherein said tightening means comprises externally threaded bolt means through one of said end portions cooperating with internally threaded bore means in the other of said end portions.

6. A stabilizer according to claim 1, wherein the positioning and orientation of said tightening means are selected to minimize friction between said camming surface and said second end portion.

7. A stabilizer according to claim 1, and further comprising loop-opening means (13,15) operable to open out the loop.

8. A stabilizer according to claim 6, wherein said loop-opening means comprises internally threaded bore means through one of said end portions and externally threaded bolt means through that one of said end portions and co-operating with said internally threaded bore means for bearing against the other of said end portions.

9. A stabilizer according to claim 1, wherein said camming surface is of a curved form in planes perpendicular to the axis of said loop, said curved form being outwardly bowed relative to said axis.

10. A stabilizer according to claim 9, wherein the angle of inclination of said curved form to the radial direction from said axis gradually increases as the distance of said curved form from said axis gradually increases.

11. A stabilizer according to claim 9, wherein said camming surface takes the form of an involute of a circle.

* * * * *